No. 845,882. PATENTED MAR. 5, 1907.
O. N. MOORE.
FARE REGISTER.
APPLICATION FILED MAY 24, 1905.

10 SHEETS—SHEET 1.

Witnesses
Frank A. Fahle
J. A. Walsh

Inventor
Otto N. Moore
By Bradford Hood
Attorneys

No. 845,882.

PATENTED MAR. 5, 1907.

O. N. MOORE.
FARE REGISTER.
APPLICATION FILED MAY 24, 1905.

10 SHEETS—SHEET 3.

Witnesses
Frank A. Fahle
J. A. Walsh

Inventor
Otto N. Moore
By
Bradford & Hood
Attorneys

No. 845,882. PATENTED MAR. 5, 1907.
O. N. MOORE.
FARE REGISTER.
APPLICATION FILED MAY 24, 1905.

10 SHEETS—SHEET 4.

Witnesses
Frank A Fahle
J. A. Walsh.

Inventor
Otto N. Moore
By
Bradford & Hood
Attorneys

No. 845,882. PATENTED MAR. 5, 1907.
O. N. MOORE.
FARE REGISTER.
APPLICATION FILED MAY 24, 1905.
10 SHEETS—SHEET 5.

Witnesses
Frank A. Fahle
J. A. Walsh

Inventor
Otto N. Moore
By Bradford Hood
Attorneys

No. 845,882. PATENTED MAR. 5, 1907.
O. N. MOORE.
FARE REGISTER.
APPLICATION FILED MAY 24, 1905.
10 SHEETS—SHEET 6.

Witnesses
Frank R. A. Fahle
J. A. Walsh

Inventor
Otto N. Moore
By
Bradford Hood
Attorneys

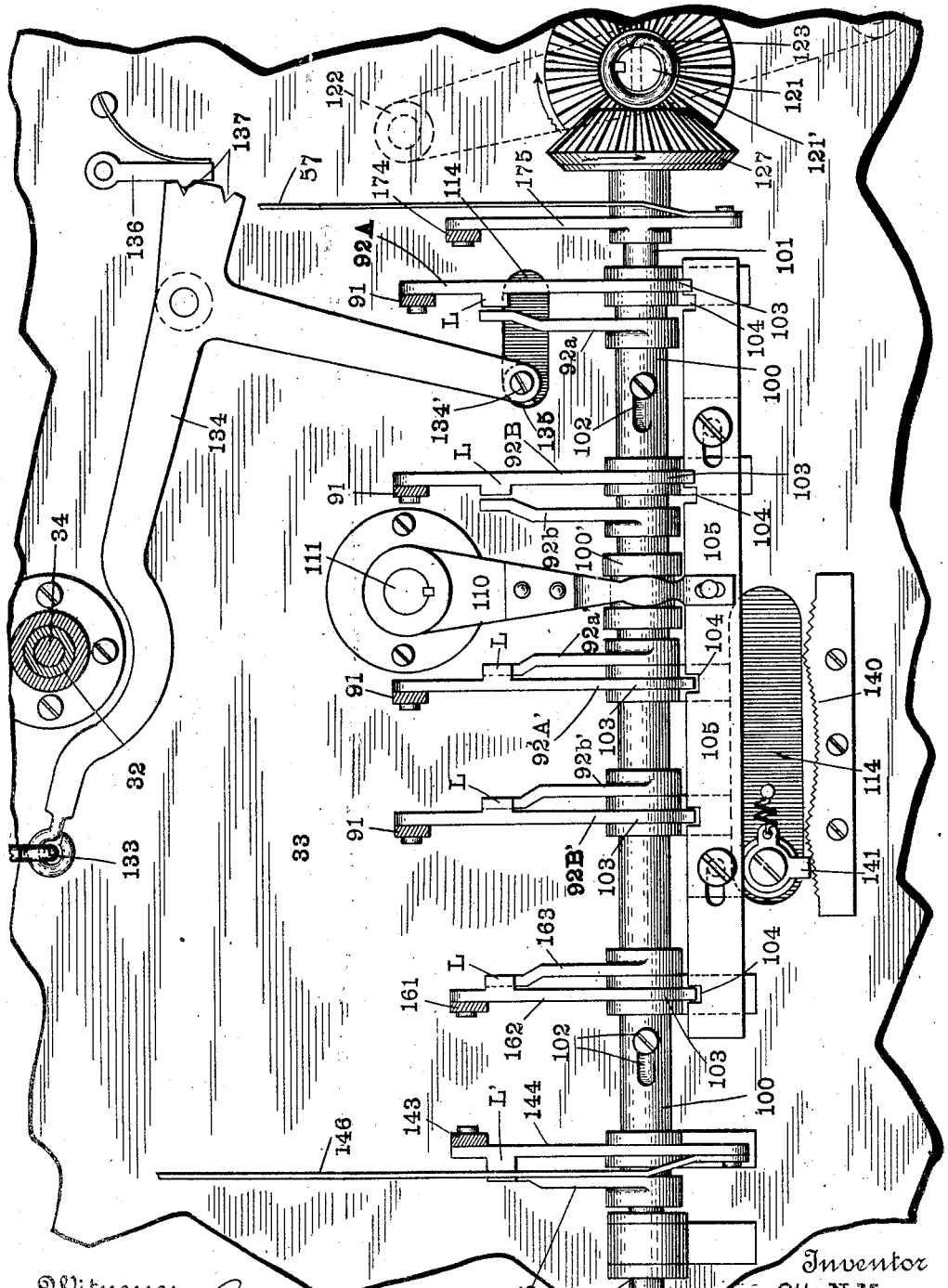

No. 845,882. PATENTED MAR. 5, 1907.
O. N. MOORE.
FARE REGISTER.
APPLICATION FILED MAY 24, 1905.
10 SHEETS—SHEET 8.
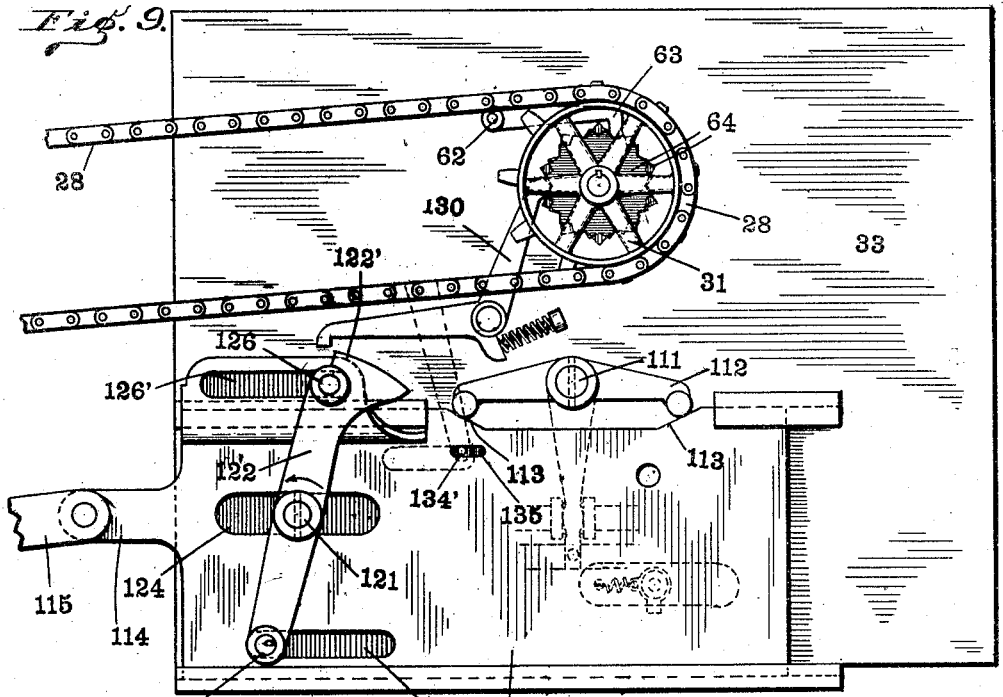
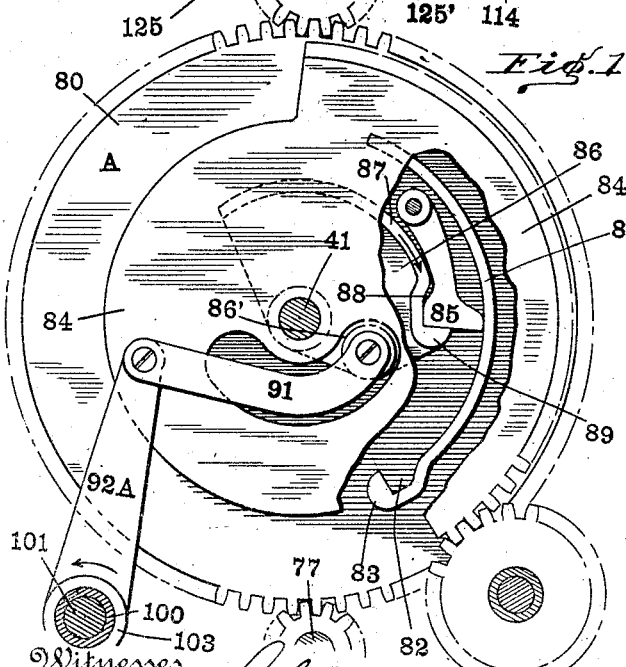
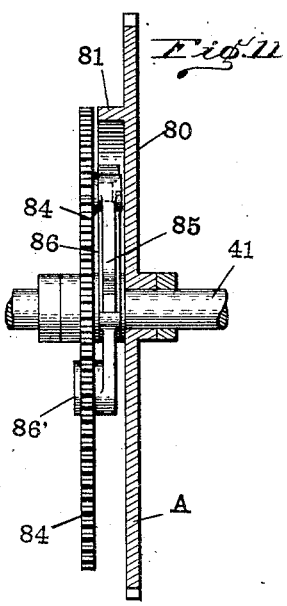
Witnesses
Frank A. Fahle
J. A. Walsh
Inventor
Otto N. Moore
By
Bradford & Hood
Attorneys

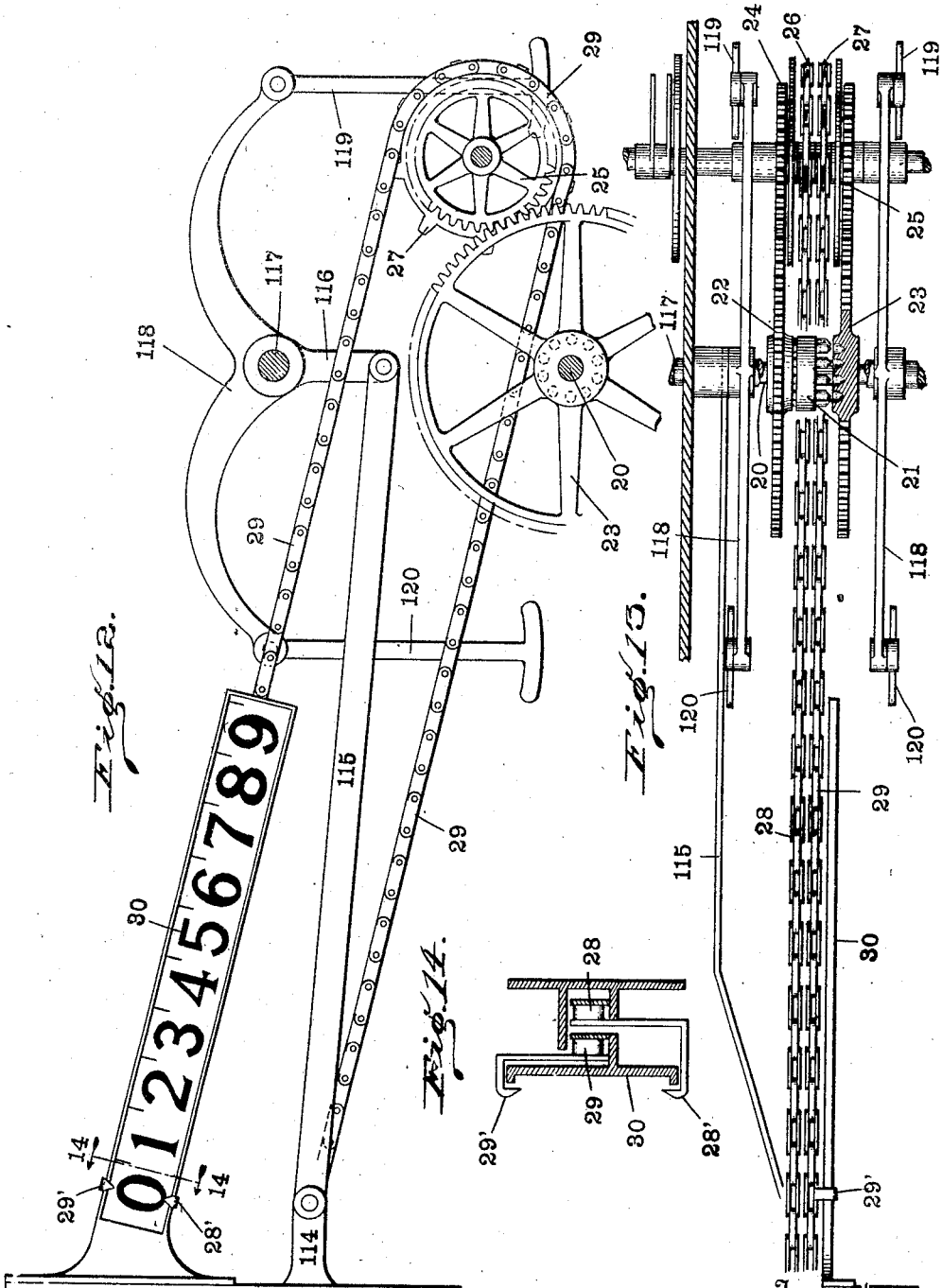

No. 845,882. PATENTED MAR. 5, 1907.
O. N. MOORE.
FARE REGISTER.
APPLICATION FILED MAY 24, 1905.
10 SHEETS—SHEET 10.
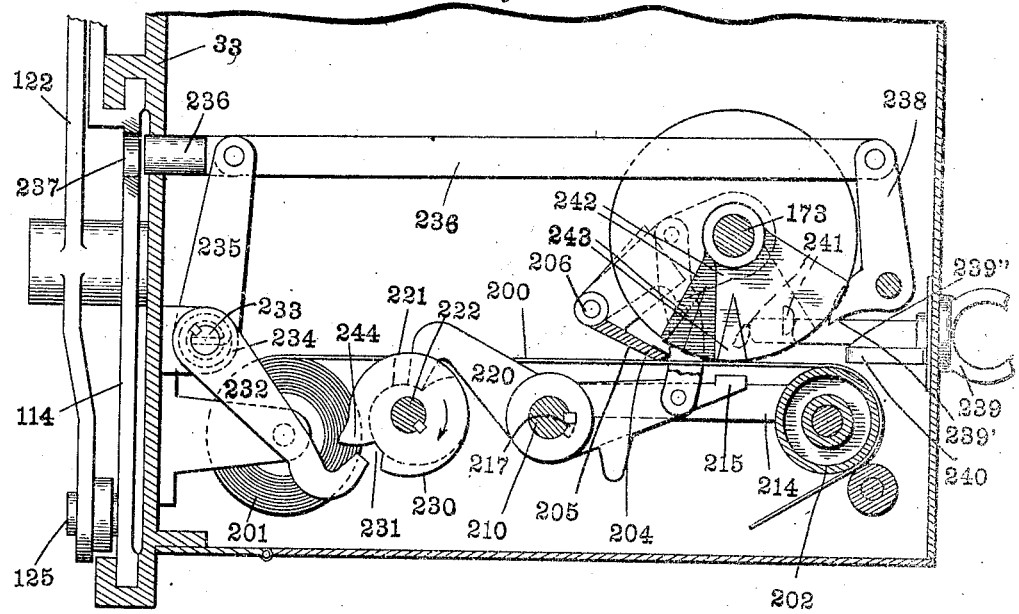
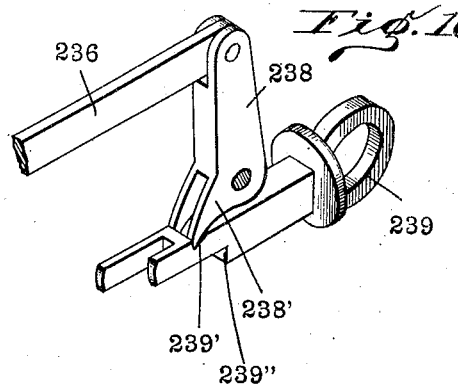
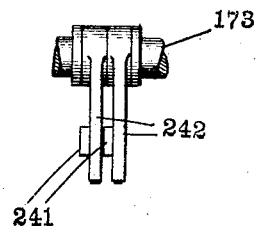
Witnesses
Frank A. Fahle
J. A. Walsh
Inventor
Otto N. Moore
By Bradford Hood
Attorneys

BEST AVAILABLE COPY

UNITED STATES PATENT OFFICE.

OTTO N. MOORE, OF INDIANAPOLIS, INDIANA.

FARE-REGISTER.

No. 845,882.　　　Specification of Letters Patent.　　　Patented March 5, 1907.

Application filed May 24, 1905. Serial No. 262,008. REISSUED

*To all whom it may concern:*

Be it known that I, OTTO N. MOORE, a citizen of the United States, residing at Indianapolis, in the county of Marion and State of Indiana, have invented certain new and useful Improvements in Fare-Registers, of which the following is a specification.

The object of my invention is to produce a registering mechanism especially designed to make separate registration and record of cash and ticket fares of varying amounts and such other registrations and records as are advisable in interurban service.

The accompanying drawings illustrate my invention.

Figure 1:
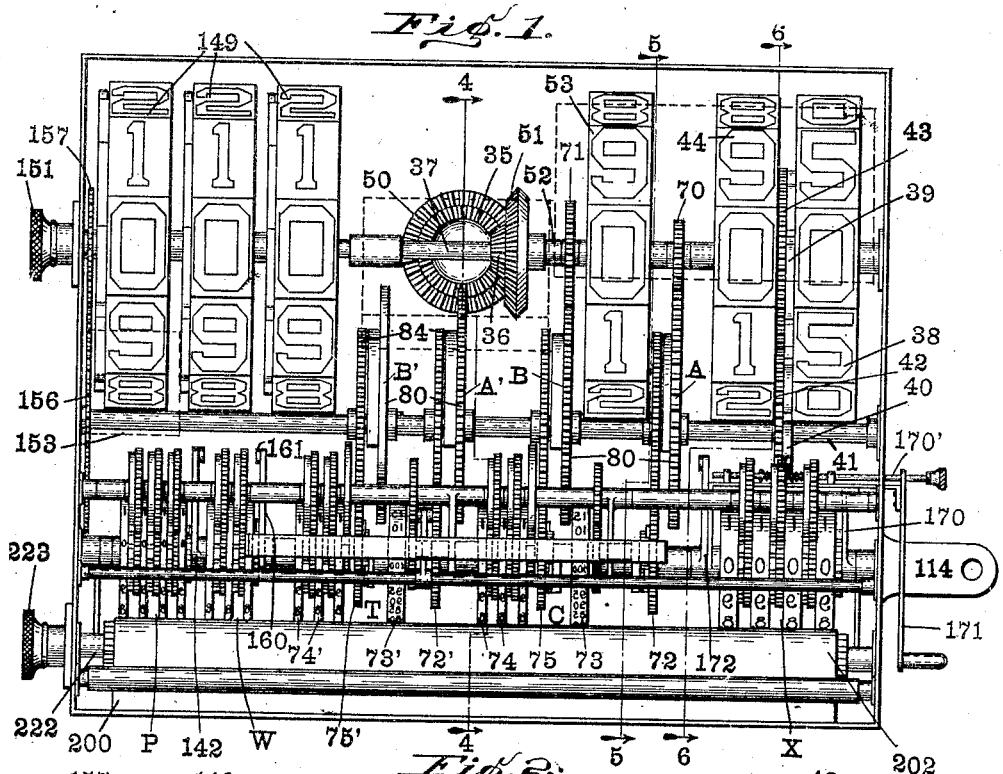
Figure 2:
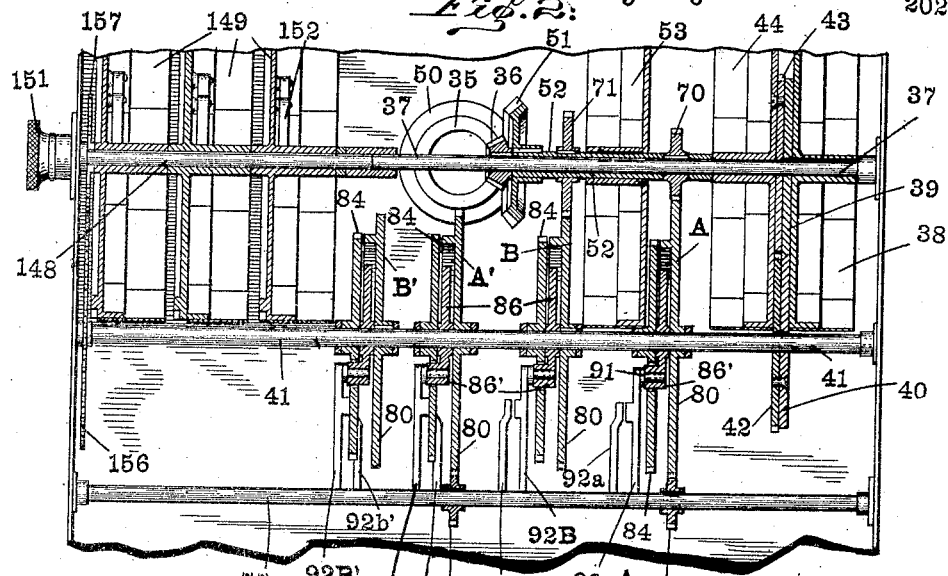
Figure 3:
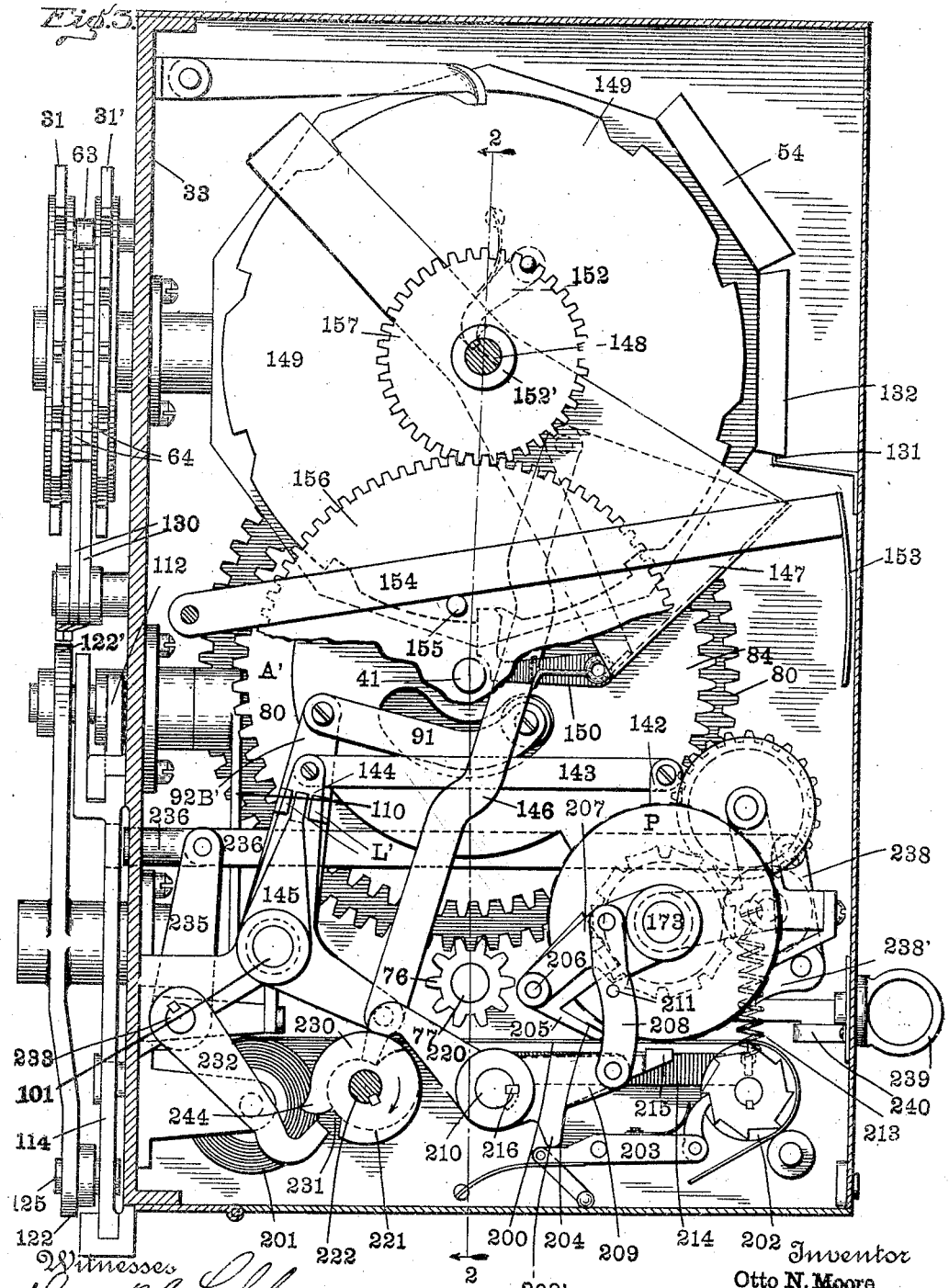
Figure 4:
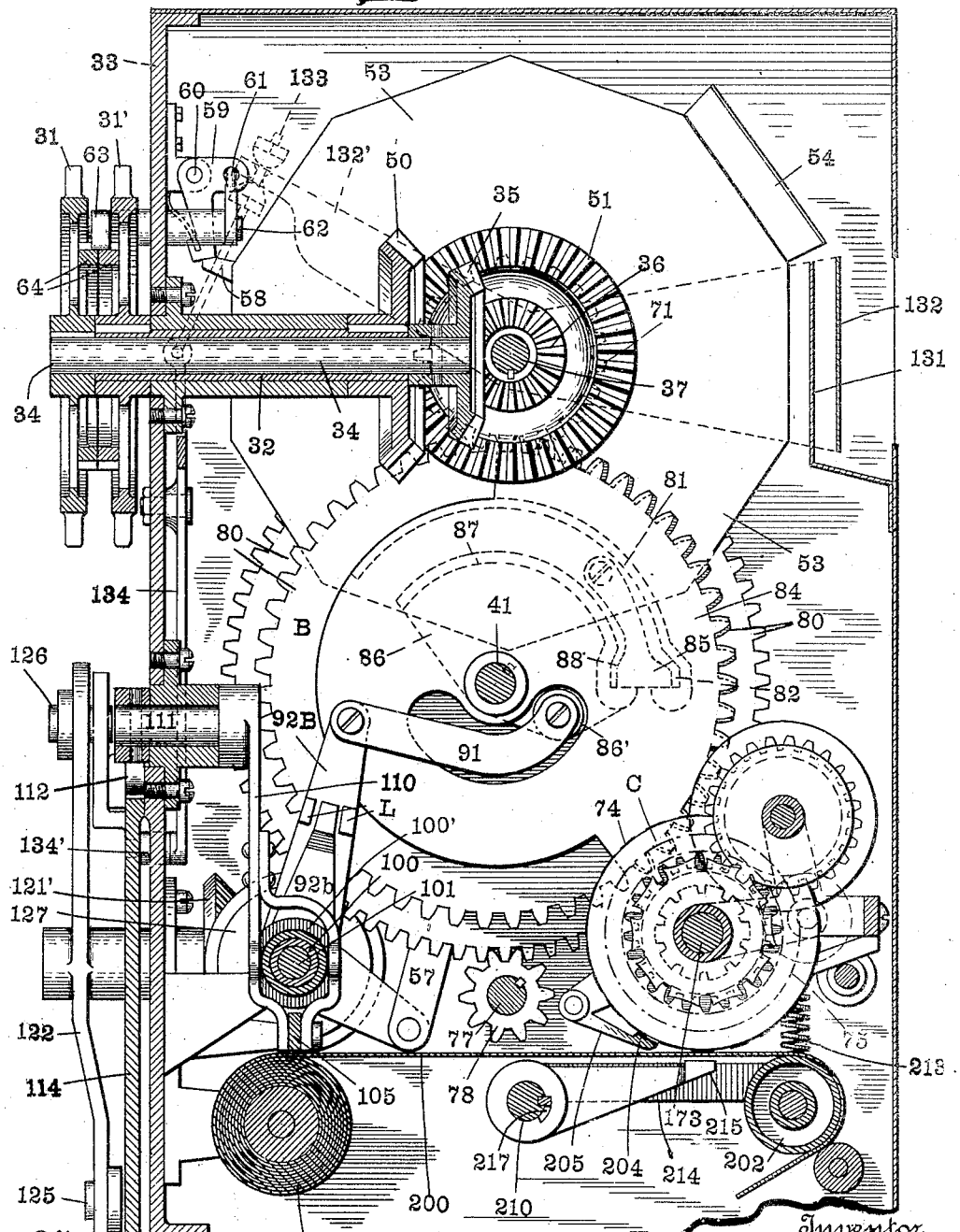
Figure 5:
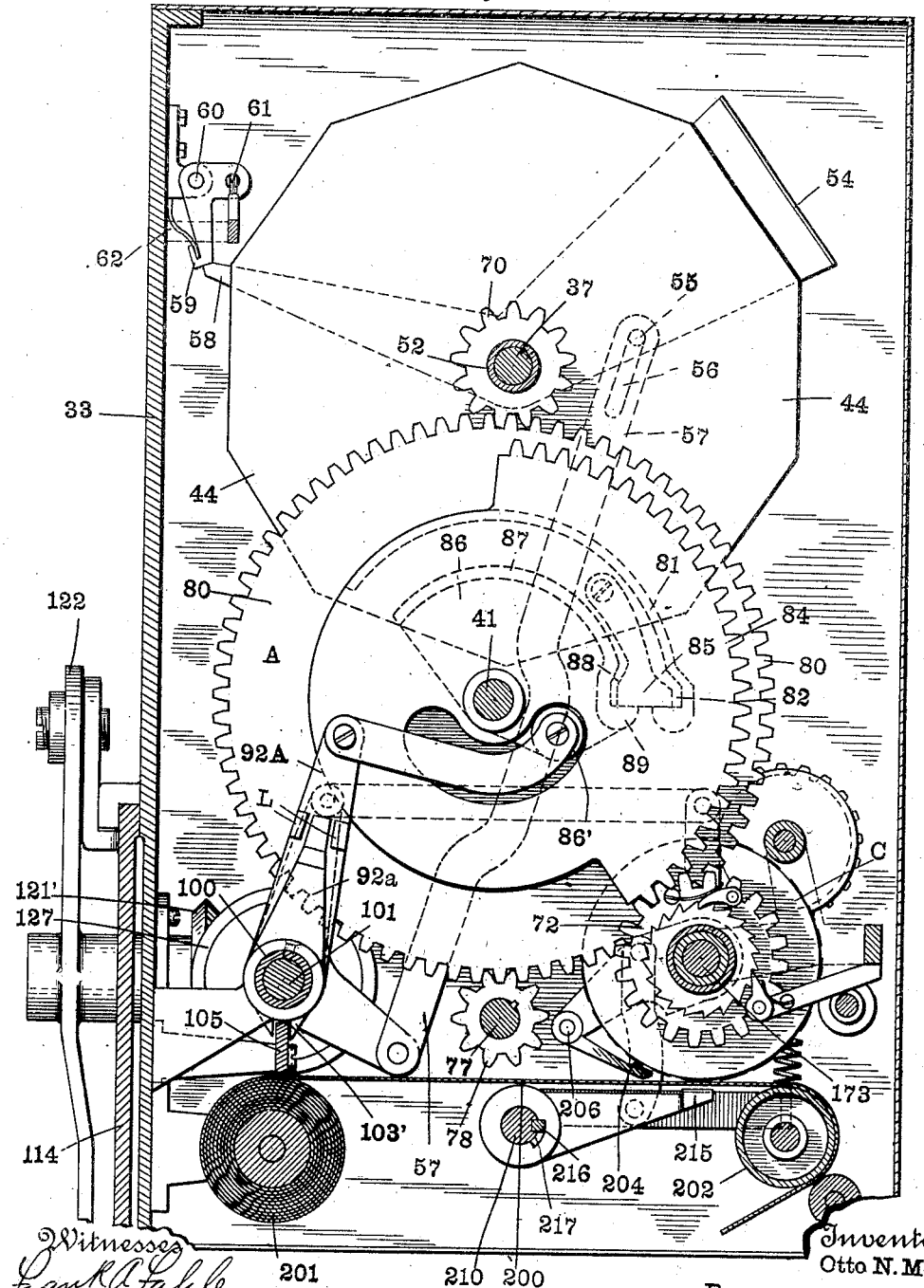
Figure 6:
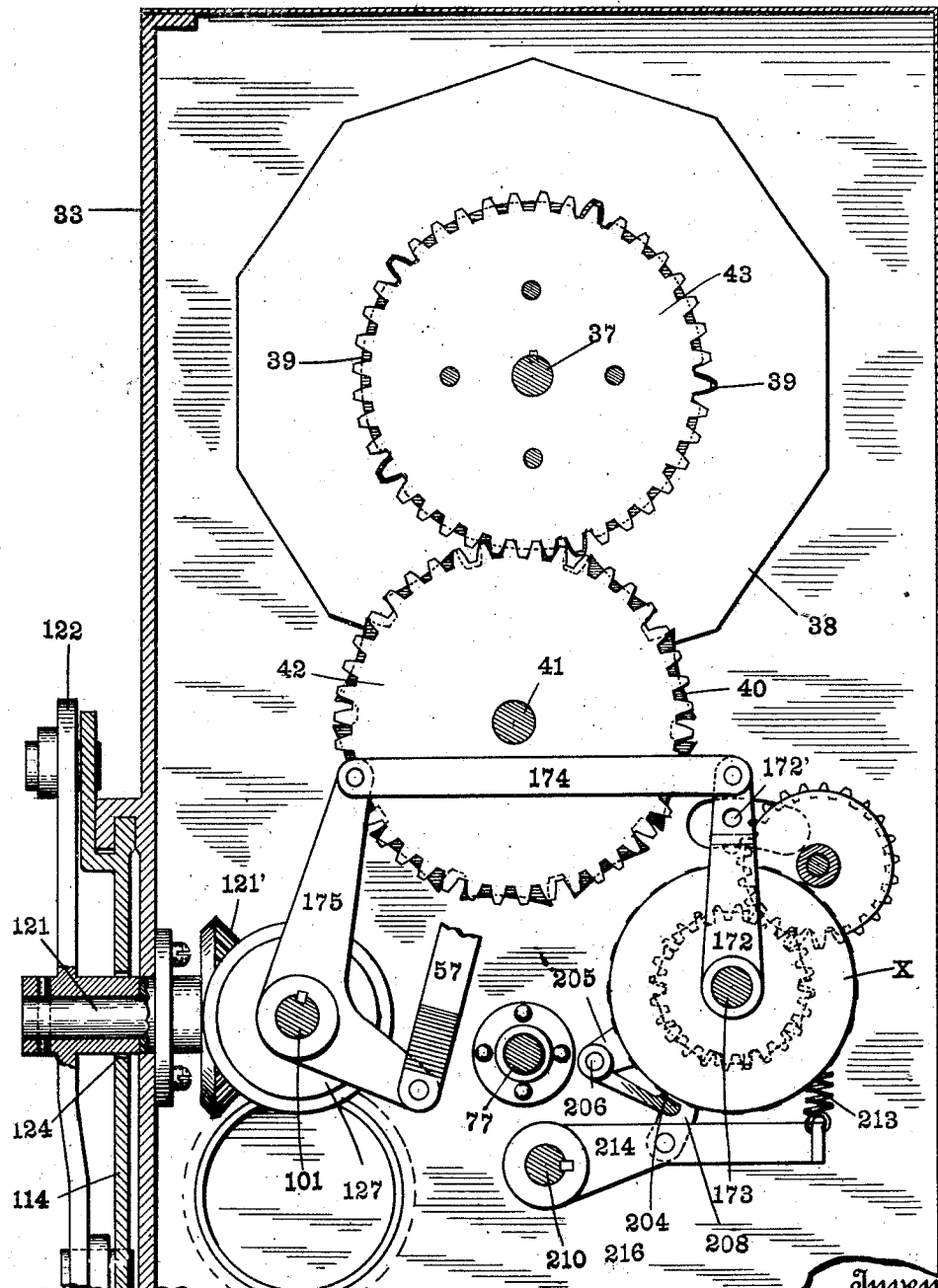
Figure 7:
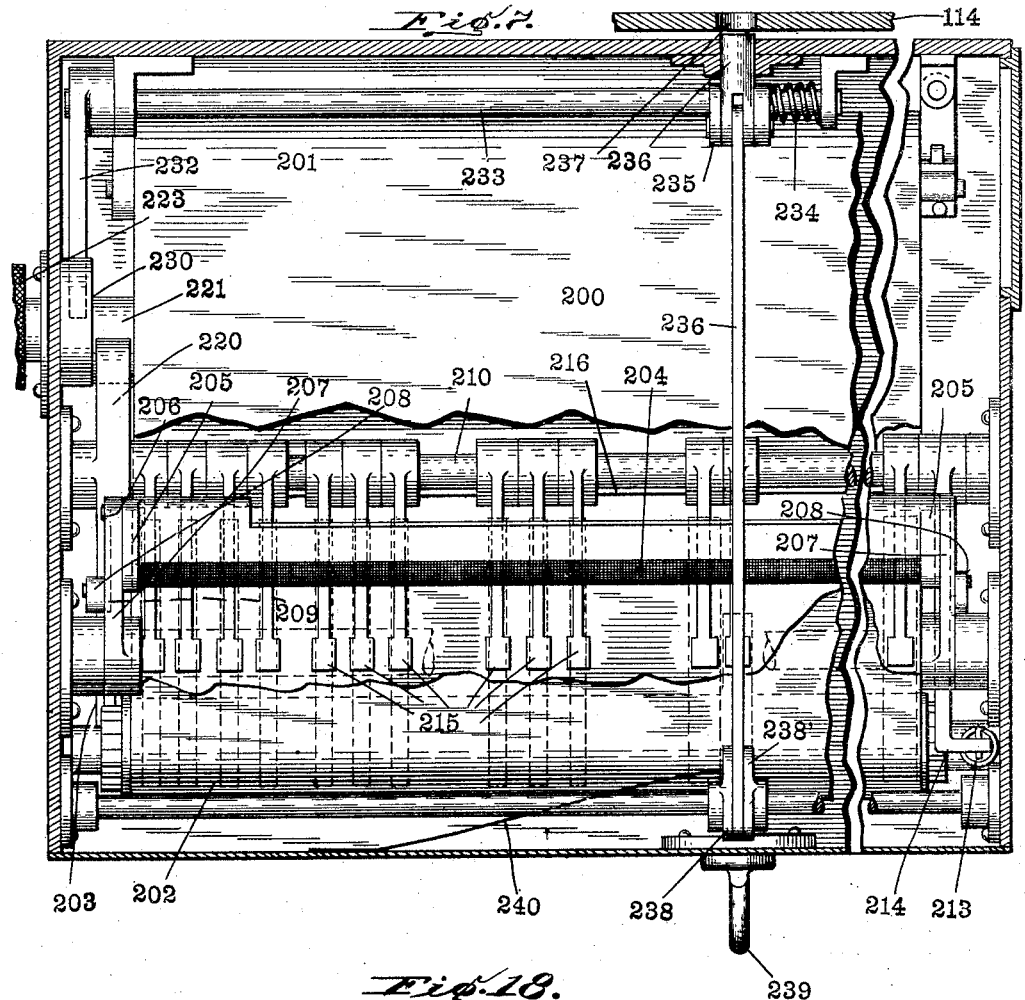
Figure 18:
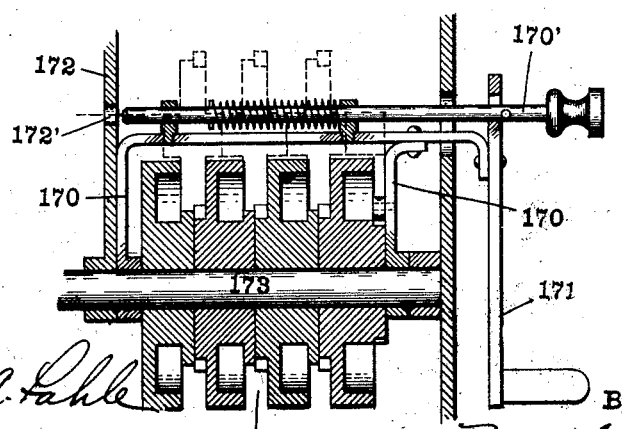

Figure 1 is a front elevation with the face of the casing and the shields removed; Fig. 2, a section on line 2 2 of Fig. 3, the scale being the same as the scale of Fig. 1; Fig. 3, a section looking to the right immediately inside of the left-hand end of the casing of Fig. 1, the scale being considerably increased; Figs. 4, 5, and 6, sections on lines 4 4, 5 5, and 6 6, respectively, of Fig. 1 and on the same scale as Fig. 3; Fig. 7, a horizontal section showing the printing mechanism in plan; Fig. 8, a detail of the mechanism for connecting the cash or ticket accumulators with the actuating mechanism; Fig. 9, a rear elevation; Fig. 10, a detail of the accumulator-actuating mechanism. Fig. 11 is a sectional view of parts shown in Fig. 10; Fig. 12, a detail of the setting mechanism; Fig. 13, a plan in partial section of the parts shown in Fig. 12; Fig. 14, a section, on a larger scale, on line 14 14 of Fig. 12. Fig. 15 is a detail of the key-locking means; Fig. 16, a perspective detail of the key; Fig. 17, an elevation of the key-recording disks, and Fig. 18 is a detail of the separable connection between the registering mechanism and the urban-passenger counter.

In the drawings I have shown a structure capable of registering fares in steps of five cents from five cents to nine dollars and ninety-five cents, inclusive, and accumulating such registrations either upon a ticket-accumulator or a cash-fare accumulator. Illustration is also made of an accumulator for indicating the total number of passengers carried within a particular district or municipality.

*The setting mechanism.*—Running the length of the car is a shaft 20, which is journaled to permit rotation and is also so arranged as to permit slight longitudinal movement. The shaft 20 carries a clutch member 21, which is adapted to engage with either one of a pair of gears 22 and 23. Gear 22 meshes with a pinion 24, and gear 23 with a similar pinion 25. The pinion 24 carries a sprocket-wheel 26, and the gear 25 carries a similar sprocket-wheel 27. Running over sprocket-wheel 26 is a chain 28, and over sprocket-wheel 27 is a chain 29. Chain 29 carries an indicator-finger 29', and chain 28 a similar indicator-finger 28', and the two fingers lie adjacent an indicating-scale 30, which has figures from "0" to "9," inclusive, with indicating half-points half-way between to indicate the five cents. Chain 28 runs over a sprocket-wheel 31, and chain 29 runs over a similar sprocket-wheel 31'. The sprocket-wheel 31' is carried by a tubular shaft 32, journaled in the register-casing 33, and sprocket-wheel 31 is carried by a shaft 34, which is journaled in the tubular shaft 32. Shaft 34 carries at its inner end a beveled pinion 35, which meshes with a pinion 36, carried by a shaft 37. This shaft has secured to it an indicator-wheel 38, which is provided on its periphery with ten facets, which are indicated alternately by the numerals "0" and "5." Wheel 38 carries a five-toothed Swiss gear 39, which meshes with a counter Swiss gear 40, journaled on a shaft 41. Gear 40 carries a toothed gear 42, which meshes with a toothed gear 43, attached to a second indicator-wheel 44, journaled on shaft 37 adjacent the indicator-wheel 38, the arrangement being such that one-fifth of a revolution of the indicator-wheel 38 will cause one-tenth of a revolution of the indicator-wheel 44, so that if a fifty-five-cent fare is to be indicated the operator will shift shaft 20 axially to bring clutch member 21 into engagement with gear 22 and then turn shaft 20 until the indicator-finger 28' lies half-way between "5" and "6" on scale 30, this movement serving to advance the wheel 39 through one and one-tenth revolutions and the indicator-wheel 44 through five-tenths of a revolution.

The tubular shaft 32 carries at its inner end a beveled pinion 50, which meshes with a beveled pinion 51, attached to a sleeve 52, which is journaled on the shaft 37. This sleeve 52 carries an indicator-wheel 53, which has ten facets on its periphery, designated from "0" to "9," inclusive, the arrangement being such that if a two-dollar fare is to be registered the operator will shift shaft 20 axially to bring clutch member 21 into engagement with gear 23 and then turn the shaft 20 until the finger 29' is brought opposite the figure "2" on scale 30, this movement causing an advancement of the indicator-wheel 53 through two-tenths of a revolution. The indication of the amount of any fare is the same whether the fare be cash or tickets. It is desirable that the operator be not permitted to see the indication accomplished by the three wheels 38, 44, and 53 until after the registration has been accomplished, and in order to accomplish this I arrange the U-shaped shield 54, which is journaled on a shaft 37. This shield has a pin 55, (indicated by dotted lines in Fig. 5,) which lies in slot 56, formed in the upper end of the link 57, which link serves to return the shield after registration has been accomplished. Shield 54 is provided with a rearwardly projecting arm 58, which is normally held by a detent 59, which is pivoted at 60 within the casing 33. One arm of the detent 59 is engaged by a lever 61, carried by a short shaft 62, journaled in the casing and provided at its outer end with a finger 63, which engages the roughened peripheries of a pair of flanges 64, carried by the adjacent face of the sprocket-wheels 31 and 31', respectively, the arrangement being such that the slightest movement of either one of the sprocket-wheels 31 or 31' will cause a withdrawal of detent 59 from the arm 58, so as to permit the shield 54 to drop down in front of the indicator-wheels, to remain there until after the registration has been completed.

*The registering mechanism.*—I make provision for registering either cash fares or ticket fares, and for this purpose I secure to shaft 37 a pinion 70, and to the sleeve 52 a pinion 71. I also provide a cash-fare-register mechanism C and a ticket-fare-register mechanism T, (see Fig. 1,) each of these registering mechanisms consisting of any desirable form of type-faced counting-wheels, with suitable transferring mechanism between the several wheels. The register C is provided with an actuating-gear 72 for its unit element 73, which unit element is provided on its face with type-indicators varying by fives from "00" to "95," inclusive, and the dollar-wheels 74 are actuated by an actuating-gear 75. The ticket-register T is similarly provided with a unit-actuator gear 72', a unit-wheel 73', and dollar-wheel 74', and an actuator 75' therefor. Interposed between gear 70 and gear 72 is an actuator A, (illustrated in Figs. 10 and 11,) and a similar actuator B is interposed between gear 71 and gear 75. Actuators A' and B' are provided to operate the gears 72' and 75', respectively, these actuators A' and B' being similar to the actuators A and B, all of the actuators A and A' being journaled upon said shaft, while the main element of the actuators B and B' are keyed to said shaft for simultaneous movement. Each of the actuators consists of a main disk 80, which in the actuators A, B, and A' is provided with peripheral teeth, which mesh with gears 70, 71, and 76, respectively, gear 76 being carried by a countershaft 77, which also carries a gear 78, meshing with the teeth of the disk 80 of actuator A, the arrangement being such that any movement of the disk 80 of actuator A will cause similar movement of the disk 80 of the actuator A'.

Each disk 80 is provided with a segmental annular flange 81, the main portion of which is concentric with the axis of the disk, but terminates in a radial pocket 82 and a terminal shoulder 83.

Journaled upon the shaft 41, adjacent each disk 80, is a segmental gear 84, which carries a pivot-pawl 85, having a radially-enlarged toe. Sleeved upon shaft 41, between the two elements 80 and 84, is a segment 86, which is provided with a peripheral flange 87, which terminates in a radial pocket 88 and a shoulder 89, the two pockets 82 and 88 being adapted to receive alternately the toe of the pawl 85. The segmental gear 84 is provided with a segmental slot, through which projects a boss 86' of a segment 86, and pivoted to this boss is one end of a link 91, the opposite end of which is pivoted to an arm 92$^A$ 92$^B$ and 92$^{A'}$ or 92$^{B'}$, the said arms corresponding to the actuators A, B, and A', respectively, and said arms being sleeved upon a sleeve 100, axially movable upon but rotatable with a shaft 101, such movement of the sleeve 100 being permitted by the pin-and slot connections 102 between the sleeve and shaft. Each of the arms 92$^A$, 92$^{A'}$, 92$^B$, and 92$^{B'}$ is provided with a peripheral flange 103, adapted to pass through a notch 104, formed in a sliding locking-plate 105, and each of said flanges 103 is provided with a transverse notch 103', adapted to receive the locking-plate 105 when it is shifted longitudinally, the arrangement being such that by shifting the plate 105 longitudinally arms 92$^A$ and 92$^B$ may be locked against swing, and the arms 92$^{A'}$ and 92$^{B'}$ may be unlocked to permit swing, or vice versa.

The locking-plate 105 is shifted by means of a lever 110, carried by a shaft 111, and the lever 110 also engages a collar 100', carried by the sleeve 100. The sleeve 100 carries four arms 92$^a$, 92$^b$, 92$^{a'}$, and 92$^{b'}$, which are arranged adjacent the arms 92$^A$, 92$^B$, 92$^{A'}$, and 92$^{B'}$, respectively, and so placed upon the sleeve 100 that when the sleeve is at one extreme of its movement the arms 92$^{b'}$ and 92$^{a'}$ are in engagement with lugs L, formed upon the arms 92$^{A'}$ and 92$^{B'}$, as shown in Fig. 8, and the arms 92$^{a'}$ and 92$^{b'}$ are out of engagement between the lugs L of the arms 92$^A$ and 92$^B$, the arrangement being such that by shifting the sleeve 100 to the right in Fig. 8 the relationship may be reversed. Shaft 111 carries at its outer end—i. e., at the back of the casing 33—a lever 112, the opposite arms of which engage cam-surfaces 113, formed on the upper edge of a sliding plate 114, which plate is shifted to one side or the other of the medial position shown in Fig. 9 by means of a link 115, which link is attached to one arm 116, carried by shaft 117, which extends the length of the car and is provided at various points in its length with a lever 118, attached at its middle to the shaft 117 and provided at its ends with a cash-indicating handle 119 and a ticket-indicating handle 120. The sleeve 100 and shaft 101 are to be oscillated together and in the same direction upon movement of the plate 114 in either direction, and in order to cause such movement I provide a shaft 121, having on its inner end a bevel-gear 121' and on its outer end a two-arm lever 122, the arm being normally held in the position indicated in Fig. 9 by means of a spring 123. The shaft 121 projects through a slot 124, formed in plate 114, of such length as to permit entire freedom of movement of the plate. The opposite ends of lever 122 carry pins 125 and 126, respectively, which lie in slots 125' and 126', respectively, in plate 114, said slots extending from the pins in opposite directions, as indicated in Fig. 9, the arrangement being such that no matter which way the plate 114 be moved from its middle position after it has moved far enough to swing lever 112 either the pin 125 or the pin 126 will be engaged by the plate 114 and the lever 122 swung in the direction indicated by the arrow in Fig. 9.

The gear 121' meshes with a bevel-gear 127, secured to shaft 101. In order to prevent the operation of a registering mechanism until the indicating mechanism has been securely set, I provide a spring-pressed catch 130, one end of which is arranged to engage the roughened wheel 64 and the other of which is adapted to be thrown into and out of the path of movement of a shoulder 122', formed on the lever 122.

It is also desirable that there be a visual indication of the character of fare being registered—i. e., cash or ticket—and in order to accomplish this I arrange in the center of the casing (see dotted lines in Fig. 1) a stationary plate 131, upon which will appear the word "Ticket," and pivoted on shaft 37 is a shield 132, upon which appears the word "Cash," this shield being adapted to be thrown down in front of the stationary plate 131. The parts described are shown in cash-indicating position in Fig. 4 and in ticket-indicating position in Fig. 8.

Shield 132 is provided with a rearwardly-projecting arm 132', (see dotted lines in Fig. 4,) to which is attached a link 133, (see dotted lines in Fig. 4,) said link being also attached to one arm of a lever 134, the opposite arm of said lever being provided with a pin 134', which lies in a short slot 135, formed in plate 114. The shield 132 will be held in either one of its two positions by means of a spring-pawl 136, adapted to engage in either one of a pair of notches 137, formed in lever 134.

In order to complete a completion of movement of plate 114 in either direction, I provide a ratchet-track 140 and a spring-pawl 141, carried by plate 114, this being a common construction in cash-registers and the like.

It is advisable that a totalizer be provided to indicate the total number of passengers carried, and for this purpose I provide the totalizer P, which consists of a plurality of type-wheels all in well-known arrangement, the unit element of which is driven step by step by means of a ratchet-lever 142. The lever 142 has one end of a link 143 attached thereto, and the opposite end of this link is attached to an arm 144, journaled upon sleeve 100 and provided with lugs L', between which lies the end of an arm 145, secured to sleeve 100, the length of the lugs L' being such as to permit the necessary axial movement of the sleeve 100 without permitting withdrawal of the arm 145 from between the lugs, so that each operation of the shaft 101 will cause an operation of lever 144, and a consequent advancement of the units element of the totalizer P. One arm of the lever 144 has attached to it the lower end of a link 146, the upper end of which is attached to a shield 147, pivoted upon a shaft 148, which is coaxial with the shaft 37. Journaled upon this shaft is a plurality of indicator-wheels 149, which are used to indicate the number of passengers per trip, and these wheels are operated step by step in a well known manner by means of a spring-pawl 150, carried by the shield 147. These counter-wheels may be returned to zero by means of a head 151, attached to the shaft 148. My invention does not relate to means for returning these elements to normal, and the construction is merely indicated in the drawings, each wheel 149 being provided with a pawl 152, which is adapted to enter a notch 152', formed in shaft 148, (see dotted lines in Fig. 3,) so that by extending shaft 148 a sufficient amount all of the counter-wheels may be caught and finally turned to zero simultaneously.

In order to indicate "in" or "out" traffic, I provide an indicator-plate 153, which is visible through a suitable sight-opening formed in the casing and provided at two points with the words "In" and "Out." This plate 153 is carried by a pivoted arm 154, which is adapted to be engaged by a pin 155, carried by a gear 156, which is geared to a pinion 157, carried by shaft 148. The operation of this part is obvious, it being apparent that by making the pinion 157 half the size of the gear 156 the counter-wheels 149 may be brought to zero position when the pin 155 is up in the position shown in Fig. 3 or at one hundred and eighty degrees therefrom, at which time the arm 154 will rest on the shaft 47, upon which the gear 156 is journaled.

It is also desirable to provide means by which it is possible to tell the number of cash-passengers and ticket-passengers, and for this purpose I provide a ticket-passenger counter W, which is similar to the other totalizers, the unit element of which is operated by a ratchet-lever 160. The lever 160 has one end of a link 161 attached to it, said link being similar to the link 143 and is hidden behind it in Fig. 3. The link 161 is attached at its other end to an arm 162, similar to the arm 92$^{b'}$ and provided with similar lugs L, between which may be received the end of an arm 163, similar to the arm 92$^{b'}$. The arm 162 is adapted to coact with the locking-plate and a notch 104 thereof in the manner described. By totalizing ticket-passengers and all passengers the total number of cash-passengers may be obtained by subtraction. It is also desirable to provide means by which the number of passengers riding within any corporate limits may be counted. Supposing, therefore, a car which has carried during the preceding part of the trip one hundred passengers, twenty-five of whom remain on the car as it enters the corporate limits of the town, and that thereafter ten passengers board the car and ride only within the corporate limits, it is necessary that the conductor be able to make a registration of the twenty-five passengers who enter the corporate limits and thereafter make a registration of the ten following passengers both upon the city-register and upon the interurban-register totalizers, either ticket or cash. In order to permit such operation, I provide the following construction: A totalizer X is provided having counter-wheels which carry upon their peripheries a set of printing-type and a corresponding set of visual indicators, which may be seen through a sight-opening in the casing. The units elements of this totalizer is operated by a ratchet-yoke 170, a portion of which projects through the casing and is provided with an operating member 171. Mounted adjacent the yoke 170 inside the casing is an arm 172, which is journaled on the shaft 173, which serves as a support for all of the main elements of the several totalizers, and mounted upon the yoke 170 is a pin 170′. The outer end of pin 170′ is projected through the casing, and its inner end is adapted to enter a hole 172′, formed in arm 172, whereby the yoke 170 and arm 172 may be connected. Any suitable means—such, for instance, as the construction shown in Fig. 18—may be used to hold the pin 170′ in either one of its positions. Pivoted to arm 172 is one end of a link 174, the opposite end of which is connected to an arm 175, keyed to shaft 101 so as to move therewith. Attached to one end of arm 175 is the lower end of link 57, by means of which the shield 54 is returned to the position indicated in Fig. 5.

*The recording mechanisms.*—It is desirable that a permanent record be made of the receipts and number of passengers for each trip, and for this purpose I arrange beneath the several type-wheels of the different totalizers a paper web 200, which passes from a storage-roller 201 over the feed-roller 202, which is actuated step by step by means of a suitable pawl-lever 203.

The type are inked by means of an inking-pad 204, which extends longitudinally in the machine and is normally held in the position shown in Fig. 3. The pad 204 is carried by a pair of bell-crank levers 205, which are pivoted at 206 to an arm 207, pivoted on shaft 173. Arm 207 has pivoted to it the upper end of a link 208, the lower end of which link is attached to an arm 209, keyed to a shaft 210. Link 208 carries a pin 211, which lies in the path of movement of the upper arm of the bell-crank lever 205, the arrangement being such that as arm 209 is swung down, Fig. 3, arm 207 will be swung downward and the upper arm of the bell-crank 205 will be brought into engagement with the pin 211 and the inking-pad 204 brought into engagement with the lowermost type, the pad passing between the type-wheels and the paper. The parts are normally held in the positions indicated in full lines in Fig. 3 by means of a spring 213, one end of which is attached to an arm 214, carried by shaft 210. Mounted upon shaft 210 are a number of hammers 215, each of which is connected to the shaft 210 by means of a key 216, projecting into a tangential slot 217, (see Figs. 4 and 5,) formed in the hammer, the arrangement being such that the hammer 215 may have a slight movement upward (by reason of the momentum) from the position shown in Fig. 3, so as to thus drive the paper against the type. The pawl-lever 203 is operated by means of a finger 209′, carried by arm 209. The shaft 210 is operated by means of an arm 220, the outer end of which engages a cam 221, (see dotted lines, Figs. 3 and 15,) carried by a shaft 222, journaled in a casing and having one end projected therefrom and provided with a suitable narrow head 223, the arrangement being such that by turning shaft 222 in the direction indicated by the arrow, Fig. 3, the shaft 210 may be swung by cam 221 against the action of spring 213 until the end of the cam is reached, whereupon the spring will serve to draw the hammers suddenly toward the paper and permit them to strike the paper and drive it against the type.

*The locking mechanism.*—In order to prevent the operation of the machine until an identifying mechanism has been set, I provide shaft 222 with a locking-cam 230, having a locking-notch 231, adapted to receive the end of an arm 232, carried by a shaft 233 in the main casing and normally urged to locking position by means of a spring 234. (See dotted lines, Fig. 15, and full lines in Fig. 7.) Shaft 233 also carries an arm 235, which is connected at its upper end to the locking-bolt 236, projected through the back of the casing and adapted to enter an opening 237, formed in plate 114. The other end of bolt 236 is attached to a key-lever 238, the arm 238' of which is adapted to engage a notch 239', formed in the key 239.

Each key 239 is provided with a shoulder 239'', adapted to be engaged by a spring 240, which serves to automatically discharge the key from the casing unless it is projected into the casing far enough to permit the catch 238' to enter the notch 239'. Each key is provided at its inner end with fingers adapted to engage lugs 241, (see dotted lines, Fig. 15,) carried by one or more type-segments 242, loosely mounted on shaft 173 and normally held at zero position by any suitable means—such, for instance, as weights 243—the arrangement being such that each key will serve to set the segments 242 in a characteristic position causing a characteristic record to be made on the paper sheet.

In order to compel the operator to produce a registration before he can regain his key, the locking-cam 230 is provided with a projection 244, which at the end of the revolution of the shaft 230 will engage arm 232 and move it just enough to withdraw catch 238' from notch 239' and permit the spring 240 to automatically eject the key.

*Operation.*—In operation suppose a fare of two dollars and fifty-five cents to have been collected. The conductor will shift shaft 20 axially to bring clutch member 21 into engagement with gear 22 and will then turn shaft 20 until the pointer 28' is brought halfway between "5" and "6," the conductor being able to feel his position by reason of the action of one of the pawls 63 on the roughened wheel 64, which is attached to the sprocket-wheel 30. Operation of the finger 63 releases the shield 54 and permits it to drop down in front of the indicating-wheels 38, 44, and 53. This movement causes a setting of the two indicator-wheels 38 and 44 in the manner already described and through gear 70 advances the element 80 of the actuator A to the position shown in Fig. 10, the flange 81 thereof swinging pawl 85 into the pocket 88 of the segment 86. The movement of the element 80 of the actuator A causes a similar movement of the element 80 of the actuator A', and consequently of the pawl of the segment 84 of the actuator A' by reason of the counter-shaft connection 78 77 76. The operator then shifts shaft 20 axially in the opposite direction and brings clutch member 21 into engagement with gear 23 and then rotates shaft 20 until the indicator 29' comes opposite the "2," the accuracy of the position being determined by the feel of the pawls 130 on the flange 64, carried by the sprocket-wheel 31. This last movement of the shaft 20 causes a setting of the indicator-wheel 53 and by reason of the rotation of the gear 71 advances the element 80 of the actuator B through two steps, this movement causing a movement of the pawl 85 of this actuator (not shown) in the manner already described. The rotation of the element 80 of the actuator B causes a similar movement of the element 80 of the actuator B', because these two elements are keyed to the shaft 47. If the fare to be registered is a cash fare, the operator will grasp one of the handles 119, and if a ticket fare he will grasp one of the handles 120. Supposing the fare to have been a ticket fare, plate 114 will be drawn to the left, Fig. 9, and the first action will be to draw the right-hand cam 113 into engagement with arm 112, and thus shift arm 110 to the position shown in Fig. 8, thus shifting sleeve 100 on shaft 101 so as to withdraw arms $92^a$ and $92^b$ from engagement with arms $92^A$ and $92^B$ and to shift arms $92^{a'}$, $92^{b'}$, and 163 into engagement with the arms $92^{A'}$, $92^{B'}$, and 162, respectively, the locking-plate 105 being also shifted in the manner already described. As soon as this occurs the right-hand end of slot 126' comes into engagement with pin 126 of lever 122, and thus swings said lever in the direction indicated by the arrow in Fig. 9, so as to turn gear 121 in the direction indicated by the arrow in Fig. 8, and thus turning gear 127, shaft 101, and sleeve 100 in the direction indicated by the arrow in Fig. 8. This movement serves to swing the several arms carried by sleeve 100. No effect will be produced by any of these arms in the registration of a ticket fare except by the arms $92^a$, $92^b$, 163, and 144, (the arm 145 always affecting its coacting arm 144, as already described, in order to count the total number of passengers.) The arms $92^{a'}$, $92^{b'}$ and 162 will thus be swung by the movement of sleeve 100. The arm 162 merely affects the ticket-totalizer T in a well-known manner and need not be further considered.

The arms $92^{A'}$ and $92^{B'}$ act upon their links 91 to swing the segments 86 of the two actuators A' and B', and as these segments are drawn down they carry the pawls $A^5$ downward, and as these pawls are attached to the segmental gears 84 of the actuators A' and B' said segmental gears are driven until the enlarged toe of each pawl is brought adjacent pocket 82 of the adjacent rib 81, whereupon the segment 86 serves to swing the pawl 85 into pocket 82, and thus permit the full and continued stroke of the segment 86 without farther advancing the segmental gear 84 and by this means determining the amount of advancement of the unit-actuator 72' and 75' of the ticket-totalizer T. In order to accomplish a proper transverse movement between the several wheels of the totalizer T, (and the same construction is to be found in the totalizer C,) the usual pawl between the gear 72' and the units element 73' is arranged to actuate the units-wheel 73' on the initial stroke of the handle 120, while the connection between gear 75' and the units-wheel 74' is reversed, so as to drive the units-wheel 74' on the return stroke of the apparatus in the usual well-known manner. As this forms no part of my invention and is a common construction, I do not deem it necessary to go further into detail. The return stroke of the shaft 101 is accomplished by the spring 123, and as the elements 86 return to the normal position (shown in Fig. 9) their shoulders 89 will pick up the adjacent pawls 85 and will return the segmental gears 84 to normal position, the annular flange 81 serving to drive the pawl back in the pocket 88 and the elements 80 remaining where they were set by the conductors, indicating operation to be reset for the next fare in the manner already described.

I claim as my invention—

1. In a fare-register, a registering mechanism for registering amounts less than one dollar, a registering mechanism for registering amounts of one dollar and over, a pair of independent actuators one for each of said registering mechanisms, transferring means between the first-mentioned register and the second register, a single means for setting each of said actuators independently, and means for driving the actuators to actuate the registering mechanisms.

2. In a fare-register, a totalizer, a pair of independent setting means, one for predetermining amounts to be registered which are subdivisions of a unit and the other for predetermining amounts to be registered which are multiples of the unit, and intermediate connecting mechanism between said setting means and the totalizer for actuating the totalizer in accordance with the positions of the two setting means.

3. In a fare-register, the combination, with a totalizer consisting of a units portion and a multi-units portion with transferring mechanism therebetween, of an actuator for the units portion, and another independent actuator for the multi-units portion, and a single means for independently predetermining the actuating effect of each of said actuators upon its respective portion of the totalizer.

4. In a fare-register, the combination, with a totalizer consisting of a units portion and a multi-units portion with transferring mechanism therebetween, of an actuator for the units portion, and another independent actuator for the multi-units portion, and means for independently predetermining the actuating effect of each of said actuators upon its respective portion of the totalizer.

5. In a fare-register, a cash-fare totalizer, a ticket-fare totalizer, means for predetermining the amount of a fare to be registered, and means for selecting either of said totalizers and actuating the same in accordance with the setting of the predetermining means.

6. In a fare-register, the combination with a pair of totalizers each consisting of a units portion and a multi-units portion with transferring mechanism therebetween, of a pair of actuators for the units portions of the two totalizers, another independent pair of actuators for the multi-units portions of the pair of totalizers, a single means for independently setting each pair of actuators, and means for connecting one totalizer or the other with its actuators, and advancing the selected totalizer in accordance with its actuator setting.

7. In a fare-register, the combination with a pair of totalizers each consisting of a units portion and a multi-units portion with transferring mechanism therebetween, of a pair of actuators for the units portions of the two totalizers, another independent pair of actuators for the multi-units portions of the pair of totalizers, means for independently setting each pair of actuators, and means for connecting one totalizer or the other with its actuators and advancing the selected totalizer in accordance with its actuator setting.

8. In a fare-register, the combination with a totalizer consisting of a units portion and a multi-units portion with transferring mechanism therebetween, of an actuator for the units portion, another actuator for the multi-units portion, a single means for independently predetermining the actuating effect of each of said actuators upon its respective portion of the totalizer, a pair of fare-indicators corresponding to the portions of the totalizer, and intermediate connections between said single predetermining means and said fare-indicators for producing an indication of a fare to be registered.

9. In a fare-register, the combination with a totalizer consisting of a units portion and a multi-units portion with transferring mechanism therebetween, of an actuator for the units portion, another actuator for the multi-units portion, means for independently predetermining the actuating effect of each of said actuators upon its respective portion of the totalizer, a pair of fare-indicators corresponding to the portions of the totalizer, and intermediate connections between said predetermining means and said fare-indicators for producing an indication of a fare to be registered.

10. In a fare-register, the combination with a totalizer consisting of a units portion and a multi-units portion with transferring mechanism therebetween, of an actuator for the units portion, another actuator for the multi-units portion, a single means for independently predetermining the actuating effect of each of said actuators upon its respective portion of the totalizer, a pair of fare-indicators corresponding to the portions of the totalizer, intermediate connections between said single predetermining means and said fare-indicators for producing an indication of a fare to be registered, and means for exposing the fare indication subsequent to the actuation of the totalizer.

11. In a fare-register, the combination with a totalizer consisting of a units portion and a multi-units portion with transferring mechanism therebetween, of an actuator for the units portion, another actuator for the multi-units portion, means for independently predetermining the actuating effect of each of said actuators upon its respective portion of the totalizer, a pair of fare-indicators corresponding to the portions of the totalizer, intermediate connections between said predetermining means and said fare-indicators for producing an indication of a fare to be registered, and means for exposing the fare indication subsequent to the actuation of the totalizer.

12. In a fare-register, the combination with a totalizer, of means for indicating any desired fare within predetermined limits, said indicating means consisting of two portions, one for indicating dollars and the other for indicating fractions of dollars, means for actuating said indicator, and means for advancing the totalizer in accordance with the indication of the indicator.

13. In a fare-register, the combination with two independent totalizers, of an indicator capable of indicating any desired fares within predetermined limits, said indicator consisting of two portions one for indicating dollars and the other for indicating fractions of dollars, means for actuating said indicator, and a selecting means for actuating one or the other of said totalizers in accordance with the indicator actuation.

14. In a fare-register, the combination with a totalizer consisting of a units portion and a multi-units portion, of an actuator for the units portion, another actuator for the multi-units portion, an indicator having two portions corresponding with the portions of the totalizer, means for exposing said indicator only upon the actuation of the totalizer, a setting-indicator for indicating the position of the units-actuator, a second setting-indicator for indicating the position of the multi-units actuator, means for setting said several indicators and actuators, and means for actuating the actuators to advance the totalizer in accordance with the setting of the indicators.

15. In a fare-register, the combination with a totalizer consisting of a units portion and a multi-units portion, of an actuator for the units portion, another actuator for the multi-units portion, an indicator having two portions corresponding with the portions of the totalizer, means for exposing said indicator only upon the actuation of the totalizer, a setting-indicator for indicating the positions of the units-actuator and the multi-units actuator, means for setting said indicator and actuators, and a single means for actuating the actuators to advance the totalizer in accordance with the setting of the indicator.

16. A register-actuator comprising a pivoted disk carrying a concentric flange terminating at one end in a pawl-receiving pocket and a pawl-engaging shoulder, a second pivoted element having a concentric pawl-engaging portion terminating at one end in a pawl-receiving pocket and a pawl-engaging shoulder, and a pivoted pawl-carrying element carrying a pawl arranged between the first two elements with a free end adapted to be forced into either pocket by the pawl-engaging surface of the opposing element.

17. A register-actuator comprising a pivoted disk carrying a concentric flange terminating at one end in a pawl-receiving pocket, a second pivoted element having a concentric pawl-engaging portion terminating at one end in a pawl-receiving pocket and a pawl-engaging shoulder, and a pivoted pawl-carrying element carrying a pawl arranged between the first two elements with a free end adapted to be forced into either pocket.

18. A register-actuator comprising two movable elements having parallel detent-engaging portions each terminating in a detent-receiving pocket, and a detent-carrying element carrying a detent arranged between said two elements and having a portion adapted to be engaged by the detent-engaging surfaces and forced by either into the pocket of the other.

19. A register-actuator comprising two movable elements having parallel detent-engaging portions each terminating in a detent-receiving pocket, and a detent-carrying element carrying a detent arranged between said two elements and having a portion held by either into the pocket of the other.

20. A register-actuator comprising a shaft, a setting element mounted on said shaft and carrying a flange which is concentric with the shaft and terminate in a pawl-receiving pocket, a second element mounted on the shaft and having a periphery which is parallel with the flange of the other element and terminate in a pawl-receiving pocket, a register-actuating element also mounted on the shaft and carrying a pawl adapted to be engaged by the concentric portions of either of the first-mentioned elements and forced thereby into the pocket of the other element, and means for swinging the second element.

21. A register-actuator comprising a shaft, a setting element mounted on said shaft and carrying a flange which is concentric with the shaft and terminate in a pawl-receiving pocket, a second element mounted on the shaft and having a periphery which is parallel with the flange of the other element and terminate in a pawl-receiving pocket, a register-actuating element also mounted on the shaft and carrying a pawl adapted to be engaged by the concentric portions of either of the first-mentioned elements and held thereby into the pocket of the other element, and means for swinging the second element.

22. In a fare-register, the combination with two totalizers, of an actuator for each of said totalizers, a selector member capable of engaging either of said actuators, a reciprocating plate, intermediate connections between said plate and the selector for shifting the selector into engagement with either of said actuators by opposite movement of the plate from medial position, and means for driving the selector through the same actuating movement for either movement of the plate, said means consisting of a shaft connected to the selector, a two-armed lever carried by said shaft and having its ends extended in opposite directions from the shaft, and means carried by the plate for engaging one arm of the lever in one direction and the other arm of the lever in the opposite direction.

23. In a fare-register, the combination with two totalizers of an actuator for each of said totalizers, a selector member capable of engaging either of said actuators, means for shifting said selector into engagement with either of the totalizers, means for driving said selector through its actuating movement in either of its positions, an operating element operable in opposite directions from a medial position, and intermediate connections between said operating element and the selector-driving means for moving said driving means in the same direction upon movement of the operating member in either direction from its medial position.

24. In a fare-register, the combination with fare-registering mechanism, of a passenger-counter, an intermediate separable connections between said fare-register and the passenger-counter whereby the passenger-counter may either be automatically operated or remain inoperative during operation of the register dependent upon the condition of said separable connection.

25. In a fare-register, the combination with fare-registering mechanism, of a passenger-counter, an actuator therefor, means for independently actuating the passenger-counter and operating means dependent in its operation upon the operation of the registering mechanism, and means for connecting or disconnecting said operating means with the passenger-counter actuator.

In witness whereof I have hereunto set my hand and seal, at Indianapolis, Indiana, this 19th day of May, A. D. 1905.

OTTO N. MOORE. [L. S.]

Witnesses:
ARTHUR M. HOOD,
JAMES A. WALSH.